(12) United States Patent
Lin et al.

(10) Patent No.: US 12,530,732 B2
(45) Date of Patent: Jan. 20, 2026

(54) ENHANCED COMPUTER VISION APPLICATION PROGRAMMING INTERFACE

(71) Applicant: MediaTek Inc., Hsinchu (TW)

(72) Inventors: Yu-Chieh Lin, Hsinchu (TW); Hungchun Liu, Hsinchu (TW); Po-Yuan Jeng, Hsinchu (TW); Yungchih Chiu, Hsinchu (TW); Chia-Yu Chang, Hsinchu (TW); Cheng-Hsun Hsieh, Hsinchu (TW); Lei Chen, Hsinchu (TW); Li-Ming Chen, Hsinchu (TW); Taichi Wang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 286 days.

(21) Appl. No.: 18/178,059

(22) Filed: Mar. 3, 2023

(65) Prior Publication Data

US 2023/0342876 A1 Oct. 26, 2023

Related U.S. Application Data

(60) Provisional application No. 63/355,143, filed on Jun. 24, 2022, provisional application No. 63/334,728, filed on Apr. 26, 2022.

(51) Int. Cl.
*G06T 1/20* (2006.01)
*G06F 8/36* (2018.01)
(Continued)

(52) U.S. Cl.
CPC ............... *G06T 1/20* (2013.01); *G06F 8/36* (2013.01); *G06T 1/00* (2013.01); *G06T 7/00* (2013.01);
(Continued)

(58) Field of Classification Search
None
See application file for complete search history.

(56) References Cited

U.S. PATENT DOCUMENTS 10,546,405 B2 1/2020 Herman
11,561,833 B1 * 1/2023 Heaton ............... G06F 9/45504
(Continued)

OTHER PUBLICATIONS

Zhiquan Guo, Jungang Han and Tao Li, "Implementing OpenVX on a polymorphous array processor," 2015 IEEE 16th International Conference on Communication Technology (ICCT), Hangzhou, 2015, pp. 598-601, doi: 10.1109/ICCT.2015.7399909. (Year: 2015).*

(Continued)

*Primary Examiner* — Andrew M. Lyons
(74) *Attorney, Agent, or Firm* — Tong J. Lee

(57) ABSTRACT

An image processing system includes one or more processors operative to receive a graph application programming interface (API) call to add a complex node to a graph. The graph includes at least the complex node connected to other nodes by edges that are directed and acyclic. The one or more processors are further operative to process, by a graph compiler at compile time, the complex node by iteratively expanding the complex node into multiple nodes with each node corresponding to one operation in an image processing pipeline. The system further includes one or more target devices to execute executable code compiled from each node to perform operations of the image processing pipeline. The system further includes memory to store the graph compiler and the executable code.

14 Claims, 5 Drawing Sheets

(51) Int. Cl.
  *G06T 1/00* (2006.01)
  *G06T 7/00* (2017.01)
  *G06T 11/20* (2006.01)

(52) U.S. Cl.
  CPC ... *G06T 11/206* (2013.01); *G06T 2207/20072* (2013.01)

(56) References Cited

U.S. PATENT DOCUMENTS

| | | | |
|---|---|---|---|
| 2016/0210721 A1* | 7/2016 | Taylor | G06T 1/20 |
| 2016/0210724 A1 | 7/2016 | Taylor | |
| 2016/0291942 A1* | 10/2016 | Hutchison | G06F 8/311 |
| 2017/0300367 A1* | 10/2017 | Zhang | G06F 16/9024 |
| 2019/0087198 A1* | 3/2019 | Frascati | H04N 9/79 |
| 2019/0303762 A1* | 10/2019 | Sui | G06N 3/04 |
| 2021/0383258 A1* | 12/2021 | O'Riordan | G06F 15/177 |
| 2022/0043688 A1* | 2/2022 | Lai | G06F 9/4881 |
| 2022/0179627 A1* | 6/2022 | Bagadia | G06F 8/433 |
| 2022/0188155 A1* | 6/2022 | Miniskar | G06F 9/5066 |
| 2022/0260596 A1* | 8/2022 | Gurkan | G01N 33/721 |
| 2023/0376781 A1* | 11/2023 | Roy Choudhury | G06N 3/092 |

OTHER PUBLICATIONS

J. Hascoë, B. D. de Dinechin, K. Desnos and J.-F. Nezan, "A Distributed Framework for Low-Latency OpenVX over the RDMA NoC of a Clustered Manycore," 2018 IEEE High Performance extreme Computing Conference (HPEC), Waltham, MA, USA, 2018, pp. 1-7, doi: 10.1109/HPEC.2018.8547736. (Year: 2018).*

E. Rainey, J. Villarreal, G. Dedeoglu, K. Pulli, T. Lepley and F. Brill, "Addressing System-Level Optimization with OpenVX Graphs," 2014 IEEE Conference on Computer Vision and Pattern Recognition Workshops, Columbus, OH, USA, 2014, pp. 658-663, doi: 10.1109/CVPRW.2014.100. (Year: 2014).*

G. Tagliavini, G. Haugou, A. Marongiu and L. Benini, "Adrenaline: An OpenVX Environment to Optimize Embedded Vision Applications on Many-core Accelerators," 2015 IEEE 9th International Symposium on Embedded Multicore/Many-core Systems-on-Chip, Turin, Italy, 2015, pp. 289-296. (Year: 2015).*

M. Akif Ozkan et al: "HipaccVX: Wedding of OpenVX and DSL-based Code Generation," arXiv:2008.11476v1 [cs.CV], Aug. 26, 2020.

Li Da et al: "GRapid: a Compilation and Runtime Framework for Rapid Prototyping of Graph Applications on Many-core Processors," Proc. of the 20th IEEE International Conference on Parallel and Distributed Systems (ICPADS 2014), Hsinchu, Taiwan, Dec. 2014.

Communication from the European Patent Office (Application No. EP 23 169 091.8) mailed Apr. 8, 2025.

Khronos AR and VR standards, Jan. 18, 2025.

Anonymous, "Node Graph Architecture—Wikipedia", Mar. 9, 2022.

* cited by examiner

ENHANCED COMPUTER VISION APPLICATION PROGRAMMING INTERFACE

CROSS-REFERENCE TO RELATED APPLICATIONS

This application claims the benefit of U.S. Provisional Application No. 63/334,728 filed on Apr. 26, 2022, and U.S. Provisional Application No. 63/355,143 filed on Jun. 24, 2022, the entirety of both which is incorporated by reference herein.

TECHNICAL FIELD

Embodiments of the invention relate to a graph application programming interface (API) that simplifies and accelerates the deployment of a computer vision application on target devices.

BACKGROUND OF THE INVENTION

Graph-based programming models have been developed to address the increasing complexity of advanced image processing and computer vision problems. A computer vision application typically includes pipelined operations that can be described by a graph. The nodes of the graph represent operations (e.g., computer vision functions) and the directed edges represent data flow. Application developers build a computer vision application using a graph-based application programming interface (API).

Several graph-based programming models have been designed to support image processing and computer vision functions on modern hardware architectures, such as mobile and embedded system-on-a-chip (SoC) as well as desktop systems. Many of these systems are heterogeneous that contain multiple processor types including multi-core central processing units (CPUs), digital signal processors (DSPs), graphics processing units (GPUs), vision processing units (VPUs), and the like. The OpenVX™ 1.3.1 specification released in February 2022 by the Khronos Group, is one example of a graph-based programming model for computer vision applications. OpenVX provides a graph-based API that separates the application from the underlying hardware implementations. OpenVX is designed to maximize function and performance portability across diverse hardware platforms, providing a computer vision framework that efficiently addresses current and future hardware architectures with minimal impact on applications.

Hardware vendors implement graph compilers and executors that optimize the performance of computer vision functions on their devices. Through the API (e.g., the OpenVX API), application developers can build computer vision applications to gain the best performance without knowing the underlying hardware implementation. The API enables the application developers to efficiently access computer vision hardware acceleration with both functional and performance portability. However, existing APIs can be cumbersome to use for certain computer vision applications. Thus, there is a need to further enhance the existing APIs to ease the tasks of application development.

SUMMARY OF THE INVENTION

In one embodiment, a method is provided for image processing. The method includes the step of receiving a graph API call to add a complex node to a graph. The graph includes at least the complex node connected to other nodes by edges that are directed and acyclic. The method further includes the steps of processing, by a graph compiler at compile time, the complex node by iteratively expanding the complex node into multiple nodes with each node corresponding to one operation in an image processing pipeline, and executing executable code compiled from each node on one or more target devices to perform operations of the image processing pipeline.

In another embodiment, a system is provided for image processing. The system includes one or more processors to receive a graph API call to add a complex node to a graph. The graph includes at least the complex node connected to other nodes by edges that are directed and acyclic. The one or more processors are further operative to process, by a graph compiler at compile time, the complex node by iteratively expanding the complex node into multiple nodes with each node corresponding to one operation in an image processing pipeline. The system further includes one or more target devices to execute executable code compiled from each node to perform operations of the image processing pipeline. The system further includes memory to store the graph compiler and the executable code.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

Figure 1:
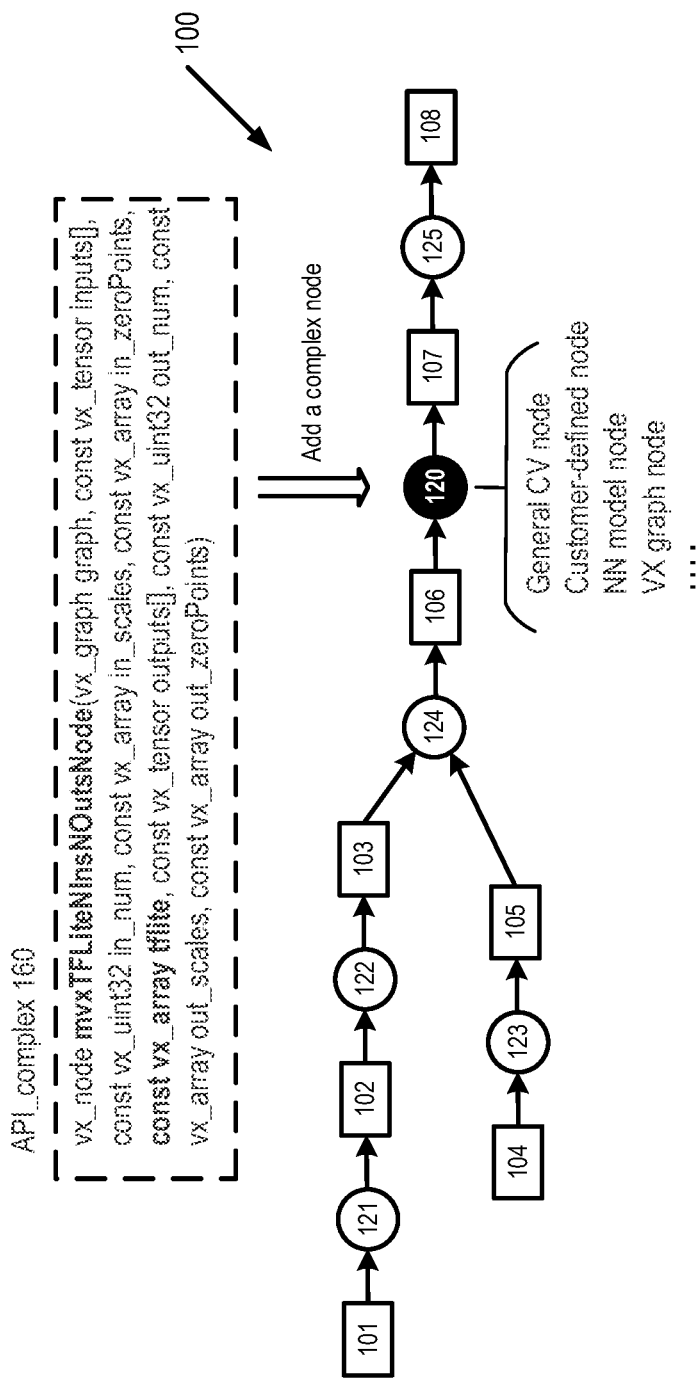
FIG. 1 is a diagram of an image processing graph according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a graph application programming interface (API) that enables a software developer to create a graph that describes an image processing pipeline. The image processing pipeline may be part of an image processing application that includes computer vision operations. The graph includes nodes corresponding to operations and edges representing dependencies among the nodes. The edges are directed and acyclic. Different nodes may correspond to different graph-based programming models, such as a computer vision programming model (e.g., OpenVX) and a deep learning programming model (e.g., TensorFlow or TensorFlow Lite). Other programming models may also be used. These programming models are supported by their respective frameworks, which provide respective libraries and other software infrastructures.

In the OpenVX programming model, a graph is composed of nodes that are added to the graph through node creation functions. A node represents a computer vision function associated with parameters. Nodes are linked together via data dependencies. Data objects are processed by the nodes. As mentioned before, OpenVX improves the performance and efficiency of computer vision applications by providing an API as an abstraction for commonly-used vision functions. These vision functions are optimized to significantly accelerate their execution on target hardware.

The graph API disclosed herein is an extension to the OpenVX API. The graph API enables a software developer to add nodes of different graph-based programming models to a graph. For example, a software developer may add a complex node to a graph of OpenVX nodes. Each OpenVX node corresponds to an OpenVX function provided by an OpenVX library. The complex node is different from an OpenVX node in that the complex node may correspond to a sequence of functions such as general computer vision functions, customer-defined functions, neural network functions, or a subgraph of OpenVX functions. The graph API disclosed herein minimizes the efforts of integrating diverse programming models into an image processing pipeline; e.g., by integrating neural network operations into computer vision operations. In one embodiment, a buffer is attached to the complex node to store the code and parameters associated with the complex node's operations. A graph compiler at compile time can decode the content of the buffer to convert the complex node's operations into an intermediate representation (IR), and then compile the IR into executable code for execution on target devices.

FIG. 1 is a diagram of an image processing graph 100 ("graph 100") according to one embodiment. Graph 100 is an example of a graph model that represents a series of imaging operations and their connections. The series of imaging operations form an image processing pipeline. Graph 100 includes multiple nodes 120-125 (indicated by circles) with each node corresponding to one or more operations. Each operation may be a function selected, for example, from a library of image processing functions, neural network functions, or other types of functions. The edges (indicated by arrows) of graph 100 connect the nodes and define the data flow from source nodes 121 and 123 to a destination node 125. Graph 100 is directed and acyclic; that is, the edges of graph 100 only go one-way and do not loop back.

Graph 100 is compiled into executable code and executed on target devices, such as image processing hardware. A central processing unit (CPU) may run a graph compiler to compile graph 100 into executable code. The executable code may be executed by the target devices as an image processing pipeline. During execution, data objects such as input data, output data, and intermediate data, may be stored in temporary buffers 101-108 (indicated by rectangles) accessible to the target devices. The CPU may invoke the execution of the image processing pipeline and receive the output of the image processing pipeline. The CPU does not invoke the execution of each individual operation in the image processing pipeline. Thus, the overhead caused by the interaction between the CPU and the target devices is significantly reduced during the execution of the image processing pipeline.

In one embodiment, a graph API enables a software developer to create graph 100 and add nodes 120-125 and edges to graph 100. In one embodiment, the graph API enables a software developer to use a single API call to add a complex node (e.g., complex node 120) to graph 100. A complex node corresponds to multiple operations performed on a piece of image data. For example, complex node 120 may be a general computer vision (CV) node, a customer-defined node, a neural network (NN) model node, an OpenVX (VX) graph node, etc. The general CV node, the customer-defined node, the neural network model node, and the VX graph node are based on different graph-based programming models. Different graph-based programming models provide different libraries of functions. A general CV node may be based on a proprietary library of computer vision functions provided by the hardware vendor. A customer-defined node may contain proprietary code programmed by a software developer and provided to the hardware vendor. The proprietary code may contain already-compiled target-dependent code. A neural network model node may correspond to the operations of multiple layers of a neural network, and may be programmed based on a deep-learning library of functions (e.g., TensorFlow, TensorFlowLite, etc.). A VX graph node may contain a subgraph of nodes with each node programmed based on an OpenVX library of functions.

The operations corresponding to complex node 120 may include computer vision functions, image processing functions, machine-learning functions, neural network functions, user-defined functions, and the like. As an example, complex node 120 may correspond to multiple operation (OP) layers of a deep-learning neural network (DNN). In one embodiment, graph 100 may include nodes that correspond to different programming models; e.g., complex node 120 may be a neural network model node, and the other nodes in graph 100 may be OpenVX nodes.

As an example, a neural network model node may be described in TensorFlow Lite, which provides a deep learning library for deploying machine learning models on edge devices. The graph API disclosed herein may provide an API_complex 160 that can be called by a software developer to add a complex node to a graph, where the complex node corresponds to a multi-layered neural network model described in TensorFlow Lite. In the example shown in FIG. 1, API_complex 160 includes a parameter vx_array tflite, which corresponds to the complex node.

In one embodiment, a general CV node, a customer-defined node, a neural network model node, or a VX graph node may be added as a complex node to a graph using a corresponding graph API call. In another embodiment, a unified graph API call may be used to add a complex node to a graph, where the complex node may be any of a general CV node, a customer-defined node, a neural network model node, or a VX graph node.

According to embodiments of the invention, a graph compiler at compile time decodes the complex node into a sequence of nodes with their respective input and output connections to adjacent node(s). Each of the nodes in the sequence corresponds to a function predefined in a library. That is, the complex node is expanded into a sequence of nodes at compile time. A software developer uses the disclosed graph API to add the complex node to the graph and the graph compiler handles the decoding of the complex node. Thus, the overhead is greatly reduced for creating a graph that contains multiple graph-based programming models.

By contrast, in some conventional systems, a node corresponds to one predetermined function. To add multiple functions such as multiple OP layers of a neural network into a graph, a software developer would add one node (one OP layer) at a time and connect input/output data objects for each node. The software developer would make an API call to add each node that corresponds to one OP layer. Thus, adding multiple OP layers would require the software developer to make multiple API calls. In some other conventional systems, a software developer would first convert the multiple OP layers of a neural network into multiple nodes; e.g., multiple OpenVX nodes. Then these converted OpenVX nodes are added to the OpenVX graph. The conversion is performed by the software developer before compile time. These conventional approaches impose significant overhead on software development.

Figure 2:
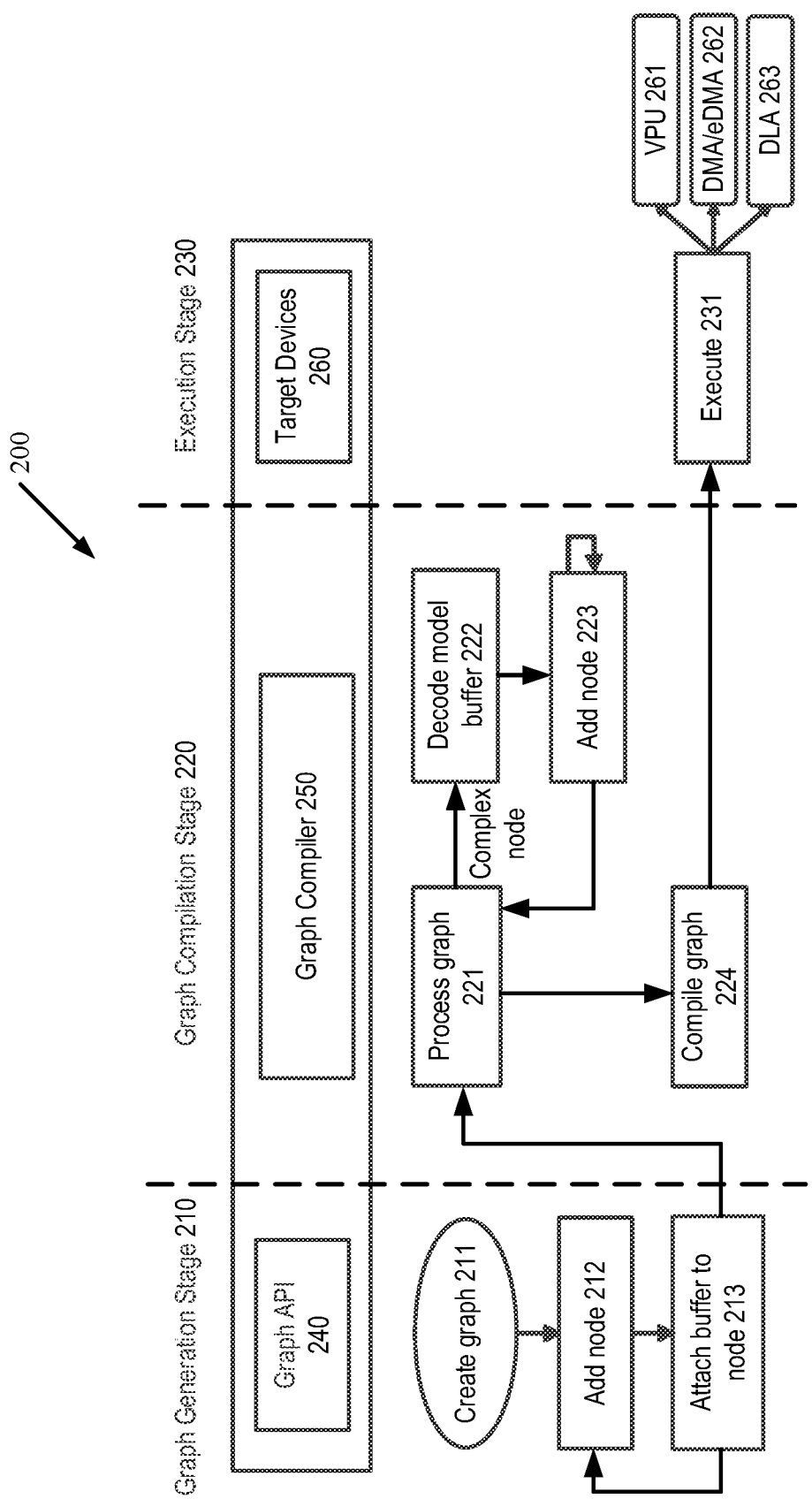
FIG. 2 is a diagram illustrating a process for processing a complex node according to one embodiment.

FIG. 2 is a diagram illustrating a process 200 for processing a complex node according to one embodiment. As an example, the complex node being processed may correspond to the operations of a multi-layered neural network model. Process 200 includes three stages: a graph generation stage 210, a graph compilation stage 220, and an execution stage 230. In graph generation stage 210, a software developer creates a graph at step 211 and adds nodes (e.g., nodes 120-125 in FIG. 1) to the graph at step 212 through the use of a graph API 240. When a node is added to the graph, a buffer is attached to the node at step 213 to store the code and parameters associated with the node. Thus, in the description herein, it is understood that the code contained in a node is stored in a buffer attached to the node.

After all of the nodes are added to the graph, graph compilation stage 220 starts with a graph compiler 250 processing each node in the graph at step 221. If the graph includes a complex node (e.g., complex node 120 in FIG. 1), graph compiler 250 decodes the complex node at step 222 by decoding the information in the buffer attached to the complex node. The decoding of the complex node generates a set of nodes, each of which is added to the graph at step 223. Each node added to the graph corresponds to a function predefined in a function library. Graph compiler 250 then compiles the graph at step 224 into executable code. Process 200 proceeds to execution stage 230 in which target devices 260 executes the executable code at step 231. Non-limiting examples of target devices 260 include a vision processing unit (VPU) 261, direct memory access (DMA) and/or enhanced DMA devices 262, a deep-learning accelerator (DLA) 263, and the like.

Figure 3:
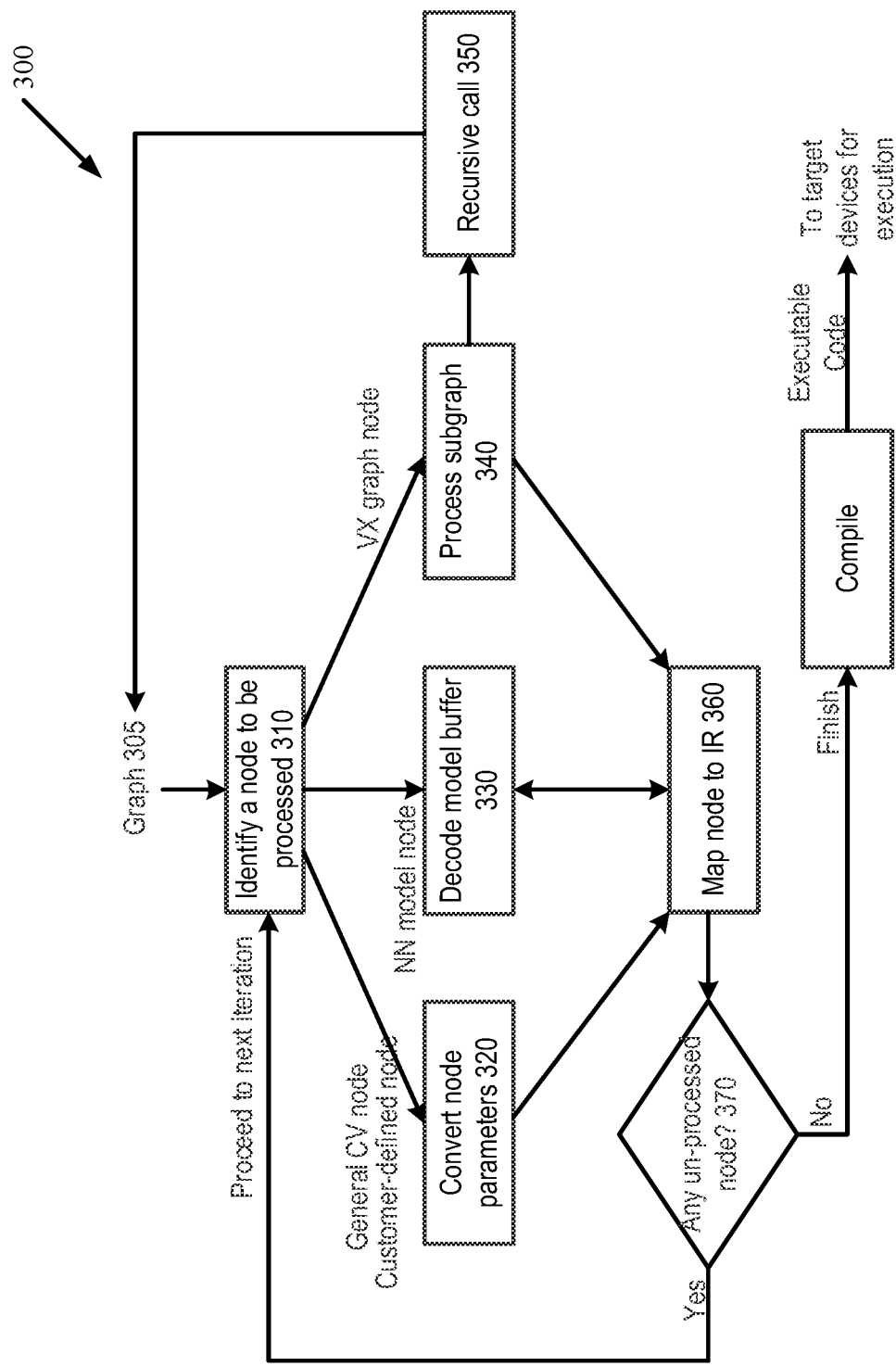
FIG. 3 is a diagram illustrating a process for processing a graph that includes a complex node according to one embodiment.

FIG. 3 is a diagram illustrating a process 300 for processing a graph 305 which includes a complex node according to one embodiment. In this example, the complex node being processed may correspond to a general CV node, a customer-defined node, a neural network model node, or a VX graph node. Graph 305 may be created and the nodes are added through graph API 240 in FIG. 2. In one embodiment, process 300 may be performed by graph compiler 250 in FIG. 2.

FIG. 3 shows the iterative processing of the nodes in graph 305. For each node to be processed, graph compiler 250 at step 310 first identifies the graph-based programming model used by the node; for example, whether the node is a general CV node, a customer-defined node, a neural network model node, a VX graph node, etc. For an OpenVX node that corresponds to a single OpenVX function (e.g., nodes 121-125 in FIG. 1), the OpenVX node may be processed as a VX graph node containing a subgraph of one node (i.e., the rightmost path of process 300 as viewed). In one embodiment, the graph API call that adds the complex node to the graph identifies a graph-based programming model used by the complex node.

If the node is a general CV node or a customer-defined node, graph compiler 250 at step 320 converts the parameters of the node into the parameters consistent with other nodes in graph 305; e.g., the parameters according to the OpenVX programming model. At step 360, graph compiler 250 maps the code contained in the general CV node or the customer-defined node into an intermediate representation (IR). In one scenario, the customer-defined node may contain already-compiled target-dependent code. Thus, the mapping at step 360 may instead include copying the already-compiled code into a command archive for execution. In one embodiment, the intermediate representation may be a proprietary format provided by a vendor of target devices 260.

If the node is a neural network model node, graph compiler 250 at step 330 decodes the model buffer attached to the neural network model node (i.e., decodes the code in the model buffer). As shown in the example of FIG. 2, a neural network model node may contain a series of nodes with each node corresponding to a neural network function; i.e., a neural network OP layer. Graph compiler 250 at step 360 maps each decoded node into a neural network function in an intermediate representation, where the neural network function is provided by a deep-learning function library. If the node is a VX graph node containing an OpenVX subgraph, graph compiler 250 at step 350 processes the subgraph recursively one node at a time at steps 310, 340, and 350, and then at step 360 maps each node in the subgraph into an intermediate representation. Graph compiler 250 at step 370 determines whether there are any un-processed nodes in graph 305. If there is an un-processed node in graph 305, process 300 proceeds to step 310 to continue the graph processing. After all of the nodes in graph 305 are processed, the intermediate representation is compiled into machine-executable code and executed by target devices 260.

Figure 4:
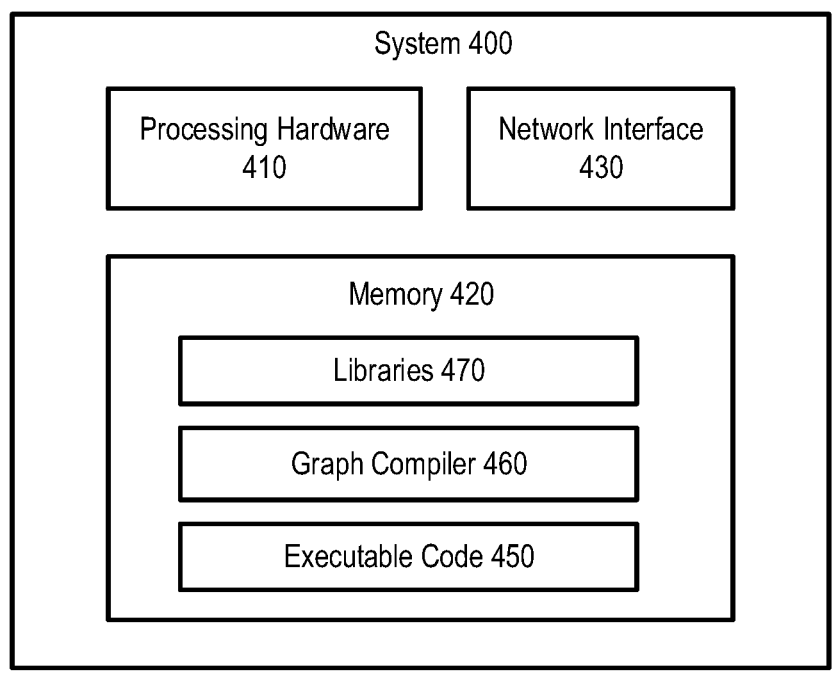
FIG. 4 a block diagram illustrating a system operative to perform image processing according to one embodiment

FIG. 4 is a block diagram of a system 400 operative to perform image processing according to one embodiment. System 400 may be embodied in many form factors, such as a computer system, a server computer, a mobile device, a handheld device, a wearable device, and the like. System 400 includes processing hardware 410, a memory 420, and a network interface 430. It is understood that system 400 is simplified for illustration; additional hardware and software components are not shown. Non-limiting examples of processing hardware 410 may include one or more processors including but not limited to a central processing unit (CPU) on which a graph compiler 460 may run, a graphics processing unit (GPU), a vision processing unit (VPU), a deep learning accelerator (DLA), a DMA/eDMA device, and the like. One or more of the processors, processing units, and/or devices in processing hardware 410 may be the target devices that perform image processing pipeline operations according to executable code 450 compiled from a graph. Graph compiler 460 may be an example of graph compiler 250 in FIG. 2.

Memory 420 may store graph compiler 460, libraries of functions 470, and executable code 450. Different libraries may support different graph-based programming models. Memory 420 may include a dynamic random access memory (DRAM) device, a flash memory device, and/or other volatile or non-volatile memory devices. Graph compiler 460 compiles a graph received through graph API calls into executable code 450 for execution on target devices such as a VPU, an eDMA device, a DLA, etc. System 400 may receive graph API calls through network interface 430, which may be a wired interface or a wireless interface.

Figure 5:
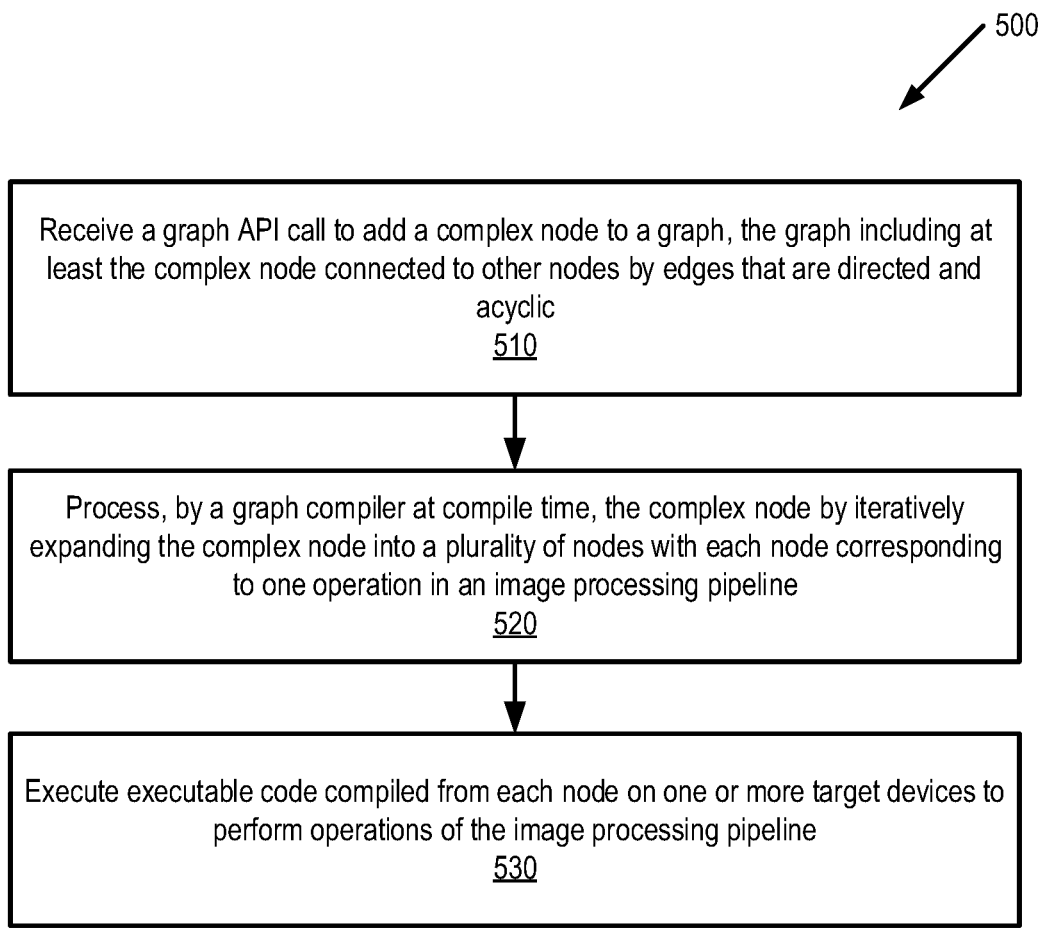
FIG. 5 is a flow diagram illustrating a method for image processing according to one embodiment.

FIG. 5 is a flow diagram illustrating a method 500 for image processing according to one embodiment. In one embodiment, the image processing includes processing a graph that includes a complex node. In one embodiment, method 500 may be performed by a system such as system 400 in FIG. 4.

Method 500 starts with step 510 when a system receives a graph API call to add a complex node to a graph, the graph including at least the complex node connected to other nodes by edges that are directed and acyclic. At step 520, the system uses a graph compiler to process, at compile time, the complex node by iteratively expanding the complex node into a plurality of nodes with each node corresponding to one operation in an image processing pipeline. The system at step 530 executes the executable code compiled from each node on one or more target devices to perform operations of the image processing pipeline.

In one embodiment, each of the other nodes in the graph corresponds to a computer vision operation in the image processing pipeline. In one embodiment, the complex node represents a multi-layered neural network model and each node of the complex node corresponds to one operation layer of the neural network model. In another embodiment, the complex node represents a subgraph of nodes corresponding to a plurality of computer vision operations. In yet another embodiment, the complex node corresponds to customer-defined code for image processing.

In one embodiment, the operations corresponding to the complex node are selected from a first library of functions, and the operations corresponding to the other nodes in the graph are selected from a second library of functions. The first library and the second library may be based on different programming models optimized for different types of operations. In one embodiment, the first library of functions is provided by a deep learning framework, and the second library of functions is provided by a computer vision framework. In another embodiment, the operations corresponding to the complex node and the other nodes in the graph are both selected from the same library of computer vision functions.

In one embodiment, the graph API call identifies a graph-based programming model used by operations corresponding to the complex node. In one embodiment, the graph API call identifies the complex node as one of the following: a proprietary computer vision (CV) node, a customer-defined node, a neural network model node, and a VX graph node based on OpenVX.

The operations of the flow diagram of FIG. 5 have been described with reference to the exemplary embodiments of FIG. 2 and FIG. 4. However, it should be understood that the operations of the flow diagram of FIG. 5 can be performed by embodiments of the invention other than the embodiments of FIG. 2 and FIG. 4, and the embodiments of FIG. 2 and FIG. 4 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for image processing, comprising:
receiving a graph application programming interface (API) call that specifies a complex node representing a multi-layered neural network model used in an image processing pipeline;
adding the complex node to a graph that contains other nodes representing computer vision operations, wherein the graph is directed and acyclic;
attaching a buffer to the complex node to store code and parameters of the complex node;
generating, by a graph compiler processing contents of the buffer at compile time, a sequence of nodes from the complex node to add to the graph, each node in the sequence corresponding to one operation layer of the neural network model; and
executing executable code compiled from each node in the graph on one or more target devices to perform computer vision operations and neural network operations in the image processing pipeline.

2. The method of claim 1, further comprising:
adding to the graph another complex node that represents a subgraph of nodes corresponding to a plurality of computer vision operations.

3. The method of claim 1, further comprising:
adding to the graph another complex node that corresponds to customer-defined code for image processing.

4. The method of claim 1, wherein operations corresponding to the complex node are selected from a first library of functions, and operations corresponding to the other nodes in the graph are selected from a second library of functions, and wherein the first library and the second library are based on different programming models optimized for different types of operations.

5. The method of claim 4, wherein the first library of functions is provided by a deep learning framework, and the second library of functions is provided by a computer vision framework.

6. The method of claim 1, wherein the graph API call identifies a graph-based programming model used by operations corresponding to the complex node.

7. The method of claim 1, further comprising:
receiving another graph API call that identifies another complex node as one of following: a proprietary computer vision (CV) node, a customer-defined node, a neural network model node, and a VX graph node based on OpenVX.

8. A system for image processing, comprising:
one or more processors to:
- receive a graph application programming interface (API) call that specifies a complex node representing a multi-layered neural network model used in an image processing pipeline;
- add a complex node to a graph that contains other nodes representing computer vision operations, wherein the graph is directed and acyclic;
- attach a buffer to the complex node to store code and parameters of the complex node; and
- generate, by a graph compiler processing contents of the buffer at compile time, a sequence of nodes from the complex node to add to the graph, each node in the sequence corresponding to one operation layer of the neural network model;

one or more target devices to execute executable code compiled from each node in the graph to perform computer vision operations and neural network operations in the image processing pipeline; and
memory to store the graph compiler and the executable code.

9. The system of claim 8, wherein the one or more processors are further operative to add to the graph another complex node that represents a subgraph of nodes corresponding to a plurality of computer vision operations.

10. The system of claim 8, wherein the one or more processors are further operative to add to the graph another complex node that corresponds to customer-defined code for image processing.

11. The system of claim 8, wherein operations corresponding to the complex node are selected from a first library of functions, and operations corresponding to the other nodes in the graph are selected from a second library of functions, and wherein the first library and the second library are based on different programming models optimized for different types of operations.

12. The system of claim 11, wherein the first library of functions is optimized for deep learning, and the second library of functions is optimized for computer vision.

13. The system of claim 8, wherein the graph API call identifies a graph-based programming model used by operations corresponding to the complex node.

14. The system of claim 8, wherein the one or more processors are further operative to receive another graph API call that identifies another complex node as one of following: a proprietary computer vision (CV) node, a customer-defined node, a neural network model node, and a VX graph node based on OpenVX.

* * * * *